Feb. 23, 1932.  F. W. GAY  1,846,389
ELECTRIC POWER GENERATION
Filed Jan. 28, 1930   2 Sheets-Sheet 1
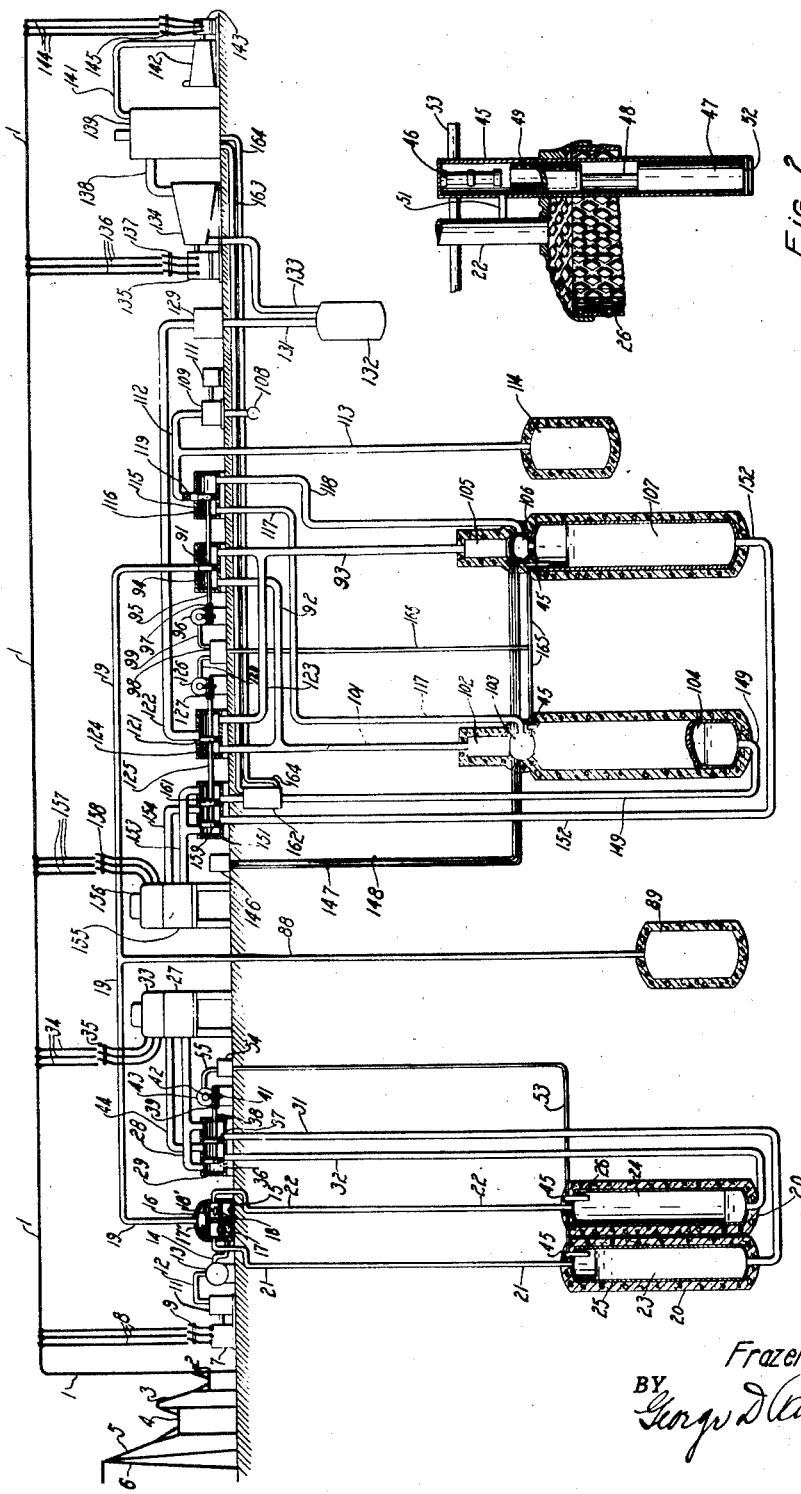
INVENTOR.
Frazer W. Gay
BY
George D. Richards
ATTORNEY.

Feb. 23, 1932.          F. W. GAY          1,846,389
              ELECTRIC POWER GENERATION
              Filed Jan. 28, 1930      2 Sheets-Sheet 2

INVENTOR.
Frazer W. Gay
BY
George D. Richards
ATTORNEY.

Patented Feb. 23, 1932

1,846,389

UNITED STATES PATENT OFFICE

FRAZER W. GAY, OF NEWARK, NEW JERSEY

ELECTRIC POWER GENERATION

Application filed January 28, 1930. Serial No. 424,094.

This invention relates, generally, to electric power generation, and the invention has reference, more particularly, to a novel method and means for generating electric power, employing internal combustion engine power units of enormous size, which units operate at very high pressures and in conjunction with other means for largely utilizing the heat energy of the hot products of combustion formed in said internal combustion engine power units.

Heretofore, efforts to manufacture high power, high pressure, so called internal combustion or explosive engines have not been successful because it was found necessary to have such huge machines turn at very low speeds and as these machines were commonly of the four cycle type, there was available but a small number of cylinder volumes of working gas per minute, resulting in poor volumetric efficiency. Also it was found necessary to build the cylinder walls exceedingly thick so that they might withstand the enormous gas pressures within, and these huge cylinders with thick walls were strained by thermal expansion and contraction even more than by the enormous total gas pressures existing therewithin. The unreliability of such huge cylinders in use, combined with the slow engine speed of such explosive engines requiring elaborate and expensive electric generator equipment, has operated to hold down the size of most internal combustion engines to one or two thousand k. w. capacity.

The principal object of the present invention is to provide a novel method and means for generating electric energy employing internal combustion engine power and associated apparatus operating at a maximum thermal efficiency, whereby a very high overall generating efficiency is obtained.

Another object of the present invention is to provide a novel method of operating a power plant comprising huge caverns located at great depths underground, fluid turbines, boilers and economizers, which consists in burning fuel in the huge underground caverns and utilizing the energy of expansion of the products of combustion to produce mechanical work by driving water or other liquid out of said caverns through a certain one or more of said fluid turbines, then utilizing such products of combustion after they have thus partly expanded to operate others of said fluid turbines and then further utilizing such products of combustion as a heating fluid by passing the same in succession through boilers and economizers, thereby largely utilizing the thermal energy of said products of combustion.

Still another object of the present invention lies in the provision of a power generating means or plant having relatively cheap generating equipment.

Since water or other liquid is used as an intervening element between the expanding products of combustion produced in the underground caverns and an energy utilizing water or other liquid turbine, and as the pressures used are very high, such liquid turbine or turbines and their connected generators may operate at relatively high speeds and in consequence will be both cheap and efficient. Also, since the natural pressure (i. e. weight) of the earth above an underground cavern or combustion cylinder is utilized to withstand the high explosive pressure existing within the same, the cost per unit volume within the cavern is low in comparison with a corresponding volume to be had within an all metal cylinder having walls thick enough to withstand the terrific pressure within.

Another object of the invention is to provide a novel power generating means or plant that is adapted to generate electric power at a substantially constant rate and which may be employed in conjunction with suitable energy storage means such as the hydro-electric generating plant disclosed in my Patent No. 1,709,846, whereby energy may be stored and then utilized during heavy load periods if desired.

Other objects of this invention, not at this time more particularly enumerated, will be clearly understood from the following description of the same.

The invention is clearly illustrated in the accompanying drawings, in which:—

Fig. 1 is a schematic representation of a power plant embodying the principles of the present invention;

Fig. 2 is an enlarged fragmentary view of a portion of the structure of Fig. 1;

Similar characters of reference are employed in all of the above described views to indicate corresponding parts.

Figures 3, 4:
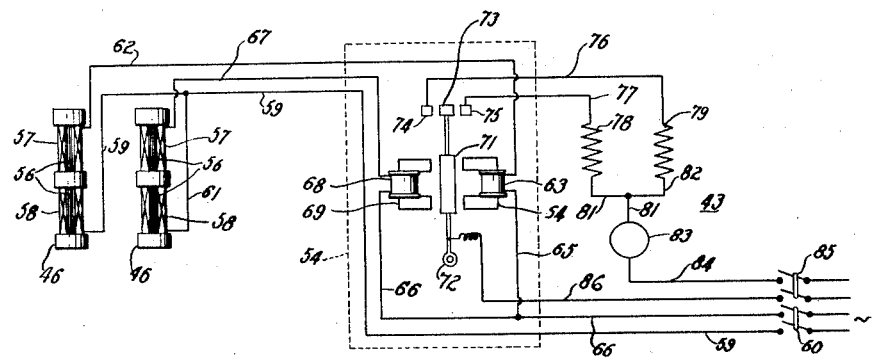
Fig. 3 is a wiring diagram of apparatus for controlling the operation of underground air compressing means.
Fig. 4 is a diagrammatic representation of a master controller.

Referring now to said drawings wherein a power plant embodying the principles of the present invention is illustrated, the reference numeral 1 designates the station power bus which is adapted to supply electric energy through an oil switch 2, connectors 3, and transformer 4 to the transmission line 5 carried on line poles, such as 6. An electric motor 7 is connected by leads 8 through a three pole switch 9 to the bus 1. Electric motor 7 is coupled in driving relation to an air compressor 11. Compressor 11 is adapted to deliver air through a discharge pipe 12 to an air storage tank 13. Storage tank 13 is connected by a pipe 14 to the air inlet chamber 15 of a valve housing 16. Valve housing 16 has an air discharge pipe 19 extending upwardly therefrom and pipes 21 and 22 connected to the sides thereof. This valve housing is adapted to alternately connect pipes 21 and 22 to the air inlet pipe 14 and air discharge pipe 19. Valve housing 16 may be of any well known construction and is illustrated as having suitable chambers interconnected by inlet valves 17 and 18 and outlet valves 17' and 18'.

Pipes 21 and 22 extend downwardly for a considerable distance into the earth and are connected at their lower ends to the tops of huge high pressure air compressor chambers 23 and 24. Although air compressor chambers 23 and 24 are of large size and are adapted to contain fluids at high pressure, yet owing to the great depth at which these chambers are positioned in the earth, the weight of the surrounding earth serves to sustain the enormous total pressures within these chambers so that they need have but relatively thin steel linings 25 and 26. Preferably, the linings 25 and 26 are surrounded with concrete 20 and are made up from corrugated steel having angularly crossing corrugations to thereby provide for relatively large expansion and contraction of these linings under the great variations of internal pressure obtaining within chambers 23 and 24.

Compressed air from tank 13 is adapted to be supplied through valve housing 16 and pipes 21 and 22 to chambers 23 and 24 to be further compressed within these chambers by water or other suitable liquid delivered to these chambers from a pump 27 by way of piping 28, valve 29 and pipes 31 and 32.

Pump 27 is illustrated as of the vertical type and is direct connected to an electric driving motor 33 which is supplied with operating current from bus 1 by way of leads 34 and switch 35. Valve 29 is shown as being of the ordinary balanced piston type although it will be understood that any other suitable type of valve may be used. Valve 29 has pistons 36 and 37 that are secured to a valve rod 38 having a threaded outer portion 39. A worm wheel 41 is threaded upon the portion 39 of the rod 38 and is driven by a worm 42 that is keyed to the shaft of a motor 43 which receives its driving energy from a suitable direct current source, such as from a storage battery or from the D. C. generator of a motor-generator set supplied from bus 1. Fig. 3 shows the electrical hook-up of motor 43 which will be further described. Rotation of worm wheel 41 under the driving action of motor 43 causes reciprocation of rod 38 and movement of pistons 36 and 37 within the casing of valve 29. The outlet of valve 29 is connected by a pipe 44 to the inlet of pump 27. Valve 29 is adapted to control the flow of water to and from chambers 23 and 24 so that the water moving within these chambers serves as pistons for compressing air therewithin.

The operation of valve 29 is determined by the water levels within chambers 23 and 24. To this end, float controlled means are mounted in the upper portions of these chambers. These float controlled means comprise hollow cylinders 45 which project downwardly through the linings 25 and 26 at the tops of the chambers 23 and 24 for a short distance into the interior of these chambers. These cylinders 45 are closed at their upper ends and are open at their lower ends. Since the float controlled means of chambers 23 and 24 are similar, only one of these float controlled means, namely, that associated with chamber 24 will be described in detail.

As especially illustrated in Fig. 2, the cylinder 45 of the float controlled means of chamber 24 is provided with a reactor 46 positioned centrally within this cylinder and secured to the top thereof. A cylindrical float 47 is contained within the lower portion of cylinder 45 and has a stem 48 extending upwardly therefrom, which stem has a magnet yoke 49 secured to its upper end. Yoke 49 is of hollow cylindrical shape and is open at its upper end so that when the float 47 rises within cylinder 45, the yoke 49 is moved upwardly into surrounding relation with the reactor 46. A vent pipe 51 connects the upper part of cylinder 45 with pipe 22 so as to enable air trapped within the cylinder 45 to escape through pipe 22. When the water level within chamber 24 falls below cylinder 45 the float 47 is retained within this cylinder by resting upon a pin 52 that extends transversely of this cylinder and has its ends secured in apertures in the walls thereof.

Suitable leads connect with the reactors 46 of the float controlled means of the chambers 23 and 24 and these leads extend outwardly of the cylinders 45 and are contained within a cable 53 which connects with a control box 54 located near the motor 43. A cable 55 connects control box 54 to motor 43.

A wiring diagram of the connections for reactors 46, motor 43 and the apparatus contained within control box 54 is illustrated diagrammatically in Fig. 3. As shown in this figure, each of the reactors 46 associated with chambers 23 and 24 comprises a laminated core 56 upon which is mounted two coils 57 and 58 which are interconnected so as to buck each other. Corresponding ends of reactors 46 are connected by leads 59 and 61 to one side of a double pole switch 60 which in turn is connected to a suitable source of alternating current. The other end of the reactor 46 associated with chamber 23 is connected by a lead 62 to one end of the energizing coil 63 of a magnet 64 contained within control box 54. The other end of coil 63 is connected by leads 65 and 66 to the other side of switch 60. The other end of the reactor 46 which is associated with chamber 24 is connected by lead 67 to one side of the energizing coil 68 of a magnet 69. The other side of coil 68 is connected by lead 66 to switch 60. Magnets 64 and 69 are opposed to each other and act upon an armature 71 that is pivoted at 72 and which carries a movable contact 73 at its upper end. Contact 73 is adapted to engage either one or the other of two stationary contacts 74 and 75 which are connected by leads 76 and 77, respectively, to oppositely wound series field windings 78 and 79 of motor 43. Series field windings 78 and 79 are connected by leads 81 and 82 to the armature 83 of motor 43. Armature 83 in turn is connected by a lead 84 to one side of a double pole switch 85 which is connected to a suitable direct current source. The other side of switch 85 is connected by a lead 86 to armature 71.

From an inspection of Fig. 3 it will be noted that both of the reactors 46 and magnet coils 63 and 68 are continuously energized from the alternating current source supplied through switch 60. When a magnetic yoke 49 is positioned below and does not surround its cooperating reactor 46, the bucking coils 57 and 58 of this reactor have open magnetic circuits so that their combined reactance is small and consequently permit relatively large currents to flow through the reactor and through its connected magnet coil 63 or 68 as the case may be, thereby causing the corresponding magnet 64 or 69 to be similarly strongly energized. Since armature 71 is unrestrained, it will normally remain in contact with either one or the other of magnets 64 and 69, depending upon the previous movement of this armature. If it be assumed that chamber 23 is empty while chamber 24 is filled with water or other suitable liquid and that the apparatus within control box 54 has just operated to effect a reverse movement of valve 29, then armature 71 is in contact with magnet 64, and movable contact 73 engages stationary contact 75, thereby energizing series field winding 78 and armature 83 to cause motor 43 to operate to move the valve rod 38 and pistons 36 and 37 toward the left and into their limiting positions shown in Fig. 1 of the drawings. Suitable limit switches (not shown) are operated at the end of the forward or reverse movements of valve rod 38 and serve to deenergize motor 43 when such limiting positions are reached as is well known to those skilled in the art.

With the pistons 36 and 37 thus positioned as in Fig. 1, water is forced out of chamber 24 by compressed air supplied from tank 13. This compressed air flows through pipe 14 into air inlet chamber 24. Since this compressed air may have a pressure of, for example, 250 lbs. per square inch, it will suffice to force the water within chamber 24 outwardly thereof and up through pipe 32, through valve 29, and through pipe 44 to the inlet of pump 27. Pump 27 drives this water through piping 28, valve 29 and down through pipe 31 into chamber 23. As the water level rises in chamber 23, the compressed air therein is further highly compressed and is driven up through pipe 21 and into valve housing 16. This highly compressed air lifts exhaust valve 17' and passes outwardly through discharge pipe 19. Since the pressure over inlet valve 17 is greater than the pressure in inlet chamber 15, valve 17 is retained upon its seat while chamber 23 is filling with water.

The water level in chamber 23 rises while that within chamber 24 falls until the water within chamber 23 approaches the top thereof whereupon float 47 in cylinder 45 within this chamber is elevated so that magnetic yoke 49, carried thereby, is caused to surround reactor 46. Magnetic yoke 49 now establishes magnetic circuits for the bucking coils 57 and 58 causing the reactance of this reactor 46 to increase tremendously, thereby materially reducing the quantity of current flowing through the circuit including this reactor. Since magnet coil 63 is included in the circuit containing this reactor, the strength of magnet 64 immediately decreases, causing armature 71 to be pulled over toward magnet 69, thereby causing engagement of movable contact 73 with stationary contact 74 and establishing a circuit through field winding 79 and armature 83 to cause motor 43 to operate in a reverse direction, thereby moving valve rod 38 towards the right, as viewed in Fig. 1. This movement of valve rod 38 causes the inlet pipe 44 of pump 27 to be connected with pipe 31 and discharge pipe 28 of pump 27 to be connected with pipe 32. This movement of the valve rod reverses the direction of water flow and causes the water to be pumped out of chamber 23 and into chamber 24. As the water passes out of chamber 23, compressed air from the storage tank 13 is supplied by way of pipe 14, inlet chamber 15, inlet valve 17 and pipe 21 to this chamber. While chamber 24 is being filled with water, the compressed air therewithin is further greatly compressed and is driven outwardly through pipe 22 into valve housing 16 and lifting outlet valve 18' is discharged through discharge pipe 19.

Discharge pipe 19 is connected by a downwardly extending pipe 88 to a high pressure air reservoir 89 positioned at a considerable depth in the earth. Reservoir 89 is similar in construction to chambers 23 and 24. Pipe 19 is also connected with an engine air inlet valve 91. Engine air inlet valve 91 is adapted to connect pipe 19 alternately with pipes 92 and 93. Valve 91 has a reciprocating piston 94 therewithin which is actuated by a valve rod 95. Valve rod 95 is reciprocated by a motor 96 acting through gearing 97 which is similar to that driving the valve rod 38. Motor 96 is controlled in its operation by a master controller contained within a housing 98 and is connected to the controller in this housing by a cable 99. Pipe 92 connects with a pipe 101 which extends downwardly into the earth for a considerable distance and communicates at its lower end with a preheater 102 which in turn communicates with a relatively small combustion chamber 103. Combustion chamber 103 communicates with an expansion chamber 104 of enormous size. Combustion chamber 103 and expansion chamber 104 are provided with sheet steel linings which are similar to the linings of chambers 23 and 24, i. e. these linings are relatively thin and are provided with diagonally crossing corrugations which permit considerable expansion and contraction of these cylinders under great variations of pressure and temperature. Pipe 93 also extends downwardly into the earth and connects with a preheater 105 which communicates in turn with combustion chamber 106 similar to chamber 103. Combustion chamber 106 communicates at its lower end with an expansion chamber 107 which is similar to expansion chamber 104. Expansion chambers 104 and 107 operate on the principle of internal combustion engine cylinders, but instead of using a solid metal piston, water is employed in lieu thereof. Preheaters 102 and 105 are of any suitable type adapted for heating the compressed air supplied through pipes 101 and 93 to combustion chambers 103 and 106 and may consist of a mass of fire bricks so arranged as to provide a multiplicity of parallel, vertical passages therethrough similar to the commonly used preheaters of steel making furnaces. The fire brick of the preheaters exposes a large surface alternately to the hot products of combustion leaving expansion chambers 104 and 107 and to the air supplied to these chambers.

Gaseous fuel is supplied through a main 108 and is drawn from this main by means of a pump or compressor 109 driven by motor 111. Pump 109 forces this fuel at high pressure into fuel pipe 112 which communicates with a downwardly extending pipe 113 connected at its lower end to a high pressure gas receiver 114. Pipe 112 also communicates with an engine gas inlet valve 115 which is similar to valve 91. Valve rod 95 extends into inlet valve 115 and has a piston 116 secured to its inner end. Valve 115 is adapted to connect pipe 112 alternately with pipes 117 and 118. Pipe 117 extends downwardly into the earth and communicates at its lower end with combustion chamber 103, whereas pipe 118 also extending downwardly into the earth communicates with combustion chamber 106. Air supplied through pipes 101 and 93 and gaseous fuel supplied through pipes 117 and 118 intermix in their respective combustion chambers 103 and 106 during the operation of the generating system. The gas within gas receiver 114 is retained at a pressure well above that of the compressed air within reservoir 89. A valve 119 in pipe 112 regulates the rate at which gas is fed into the gas inlet valve 115. Pipes 19, 112 and 108, pump 109 and valves 115, 91 and 121 can be built to withstand the enormous pressures obtaining in the system because of the relatively small diameters or dimensions of these members, i. e. since the dimensions of these members are relatively small, the total internal pressures obtaining are not excessive and may be retained by walls of reasonable thickness.

The products of combustion expanded in expansion chamber 104 are exhausted through preheater 102 and pipe 101 into an exhaust valve 121 which delivers these products of combustion into an exhaust pipe 122. Likewise the products of combustion expanded in chamber 107 are exhausted through preheater 105, pipe 93 and communicating pipe 123 into exhaust valve 121 which delivers these products of combustion into exhaust pipe 122. These exhaust gases or products of combustion may be under a pressure of from 100 to 200 pounds per square inch owing to the relatively great static water head in piping 149 and 152. Valve 121 has a piston 124 therewithin which is carried by a valve rod 125. Valve rod 125 is reciprocated by a motor 126 acting through gearing 127 similar to gearing 97. Motor 126 is controlled in its operation by the master controller contained within housing 98. Motor 126 is connected to the master controller within housing 98 by a cable 128.

Exhaust pipe 122 discharges into a reheater 129. Reheater 129 is of any suitable type and is adapted to heat the exhaust gas delivered by exhaust pipe 122 to a maximum permissible temperature of for example, 1000° F. preparatory to further use of these gases. Reheater 129 discharges the heated exhaust gases into a pipe 131 which delivers these gases to an underground reservoir 132. A pipe 133 extends into reservoir 132 and is adapted to conduct the exhaust gases therefrom into gas turbine 134 which drives a generator 135. Electric power generated by generator 135 is delivered by way of leads 136 through switch 137 to station bus 1. Gas turbine 134 exhausts by way of pipe 138 into a boiler or boilers 139, wherein the still hot exhaust gases are utilized for initially generating steam and then as a heating fluid for economizers contained within boiler 139 in a manner well known to those skilled in the art after which these cooled exhaust gases are exhausted to atmosphere through the boiler stack. Steam generated within boiler or boilers 139 is delivered through pipe 141 to steam turbine or turbines 142 which exhaust through suitable condenser apparatus not shown. Turbine 142 drives generator equipment 143 which delivers electric energy by way of leads 144 and switch 145 to station bus 1.

A device 146 comprising a housing containing a pair of compressors is adapted to force a spontaneously combustible gas through a pipe 147 and compressed air through a pipe 148. Pipes 147 and 148 extend downwardly into the earth and both of these pipes discharge into combustion chambers 103 and 106, wherein the spontaneously combustible gas burns. Device 146 is only used during the starting operation of the expansion chambers 104 and 107, i. e. until combustion chambers 103 and 106 become hot. This device 146 by supplying spontaneously combustible gas and air to the combustion chambers provides the necessary igniting flame for effecting the ignition of the fuel supplied to these chambers through pipes 117 and 118.

A water pipe or conduit 149 connects with the lower end of expansion chamber 104 and extends upwardly through the earth to a valve housing 151. A similar water pipe or conduit 152 connects with the bottom of expansion chamber 107 and extends upwardly and has its upper end connected to the valve housing 151. Valve housing 151 is adapted to alternately connect pipes 149 and 152 to piping 153 and a pipe 154. Piping 153 connects with the inlet port and pipe 154 connects with the outlet port of a water turbine 155 which drives a generator 156. Generator 156 delivers electric energy through leads 157 and switch 158 to bus 1. Valve housing 151 may be of any suitable type but is illustrated as a balanced piston valve having a construction similar to valve housing 29. Valve housing 151 has two pistons 159 and 161 which are secured upon valve rod 125 that extends into valve housing 151.

A feed water heater 162 surrounds the upper portion of pipe 149. Feed water heater 162 is connected by pipes 163 and 164 to boiler 139 and is adapted to heat the feed water supplied to this boiler. The water passing through pipe 149 from chambers 104 and 107 is very hot and consequently adequately heats the water within feed water heater 162. Expansion chambers 104 and 107 are provided with float controlled means similar to such means associated with high pressure chambers 23 and 24. The cylinders 45 of the float controlled means of chambers 104 and 107 are connected by cable 165 to the master controller contained within housing 98.

Fig. 4 is a diagrammatic representation of the master controller contained within housing 98 which controller by timing the operation of motors 96 and 126 regulates the operation of valves 91, 115, 121 and 151. As shown in this figure the master controller comprises a variable speed motor 166 which may be adjusted to drive at any desired speed. Motor 166 is connected by reduction gearing consisting of a worm 167 and a wheel 168 to the shaft 169 having a plurality of spaced timing wheels 171, 172, 173 and 174 securely mounted thereon and insulated therefrom. These timing wheels have electric conducting portions 175 and insulating portions or strips 176. A pair of spaced brushes 177 and 178 bear upon the peripheries of each of the wheels 171 to 174.

Brushes 177 are connected to a common lead 179 which extends to the double pole switch 181. Brush 178 associated with timing wheel 171 is connected by a lead 182 through a limit switch 183 to one field winding 184 of motor 126. Field winding 184 is connected by a lead 185 to the armature 186 of motor 126 which armature is connected in turn by lead 185 to switch 181. Switch 181 is adapted to connect leads 179 and 185 to a suitable source of current. Brush 178 associated with timing wheel 172 is connected by lead 187 through a limit switch 188 to a second series field winding 189 of motor 126. Series field winding 189 is oppositely wound to winding 184. Winding 189 is connected by leads 191 and 185 through armature 186 to switch 181. Brush 178 of timing wheel 173 is connected by lead 192 through field winding 194 to the armature 195 of motor 96. Armature 195 is connected in turn by leads 192 and 185 to the switch 181. Also, brush 178 associated with timing wheel 174 is connected by a lead 196 through field winding 198 to armature 195. Field windings 194 and 198 are also oppositely wound.

The operating coil of limit switch 183 is connected with the reactor 46 mounted in the cylinder 45 which extends into the expansion chamber 104. Likewise the operating coil of limit switch 188 is connected to the reactor 46 positioned within the cylinder 45 extending into the expansion chamber 107. Inasmuch as these connections of the operating coils of these limit switches is obvious, such connections are not shown in Fig. 4 of the drawings in order to simplify the same, the several leads connecting these operating coils to the reactors being contained within cable 165, shown in Fig. 1.

The timing wheels 171 to 174 driven by motor 166 are adapted to establish circuits through the field windings and armatures of motors 126 and 96 so as to cause these motors to operate valves 151, 121, 91 and 115 in the proper time sequence. When timing wheel 171 completes a circuit for field winding 184, the motor 126 rotates in one direction to move valve rod 125 to the right as viewed in Fig. 1. When timing wheel 172 completes a circuit for field winding 189, the motor 126 operates in the reverse direction to move valve rod 125 to the left as viewed in Fig. 1. When timing wheel 173 completes a circuit for field winding 194, the motor 96 operates in one direction to move valve rod 95 to the left as viewed in Fig. 1. When timing wheel 174 completes a circuit for field winding 198, the motor 96 operates in the reverse direction to move valve rod 95 to the right as viewed in Fig. 1.

The particular positions of the timing wheels shown in Fig. 4 correspond with the positions of the water levels obtaining in the expansion chambers 104 and 107 as shown in Fig. 1 of the drawings. It will be noted that circuits extending through timing wheels 171, 173 and 174 are open and that timing wheel 172 is maintaining a circuit for field winding 189. This circuit extends from the upper side of switch 181 through lead 179, brush 177 associated with timing wheel 172, conducting portion 175, brush 178, lead 187, field winding 189 and armature 186 and by way of lead 185 to the lower side of switch 181. With this circuit established, motor 126 has positioned valve rod 125 and pistons 124, 159 and 161 to connect expansion chamber 107 with exhaust pipe 122 and with the water discharge pipe 154 of turbine 155, while connecting main expansion chamber 104 with the inlet pipe 153 of water turbine 155, so that while expansion chamber 107 is exhausting burnt gases, the expansion chamber 104 is operating on its working stroke to drive water or other fluid used through turbine 155 and into expansion chamber 107. Since motor 96 is not energized, valve rod 95 and pistons 94 and 116 are in their neutral positions so that the air and fuel supply are shut off from the combustion chambers 103 and 106. Motor 96 is provided with the customary neutral return devices (not shown) which act in a manner well known to those skilled in the art to return the valve rod 95 and pistons 94 and 116 to their neutral positions whenever the operating circuits of field windings 194 and 198 are both discontinued. Likewise motor 126 is provided with such neutral return devices for returning valve rod 125 and pistons 159, 161 and 124 to their neutral positions whenever the operating circuits of the field windings 184 and 189 are both discontinued.

As the water level in expansion chamber 107 approaches the top of this chamber, brush 178, bearing on conducting portion 175 of timing wheel 172, rides off of this conducting portion and onto insulating portion 176, thereby breaking the circuit for field winding 189 and causing motor 126 and valve rod 125 to return to their neutral positions.

If for any reason, the water level in chamber 107 should reach the top of this chamber before brush 178 rides off of the conducting portion 175 of timing wheel 172, then the reactor 46 within cylinder 45 associated with chamber 107 will so decrease the current flowing through the operating coil of limit switch 188 as to cause this switch to open, breaking the circuit for field winding 189 and returning motor 126 and valve rod 125 to their neutral positions.

Simultaneously with the breaking of the circuit through field winding 189, the brush 177 bearing on insulating portion 176 of timing wheel 171 rides onto conducting portion 175 of this wheel, thereby completing a circuit for field winding 184 to effect movement of valve rod 125 to the right as viewed in Fig. 1 so as to connect expansion chamber 104 to exhaust pipe 122 and to the outlet pipe 154 of turbine 155, while connecting expansion chamber 107 to the inlet pipe 153 of turbine 155. At the same time that the circuit for field winding 184 is completed, a circuit for field winding 194 is completed through timing wheel 173 so that motor 96 operates to move valve rod 95 and pistons 94 and 116 to the left as viewed in Fig. 1, thereby connecting combustion chamber 106 with the compressed air supply pipe 19 and with the gaseous fuel supply pipe 112 and pump or compressor 109. The burning of fuel in combustion chamber 106 forms gases which drive the water downwardly in chamber 107, through turbine 155 and into chamber 104.

Before the water level has fallen very low in expansion chamber 107, brush 178 riding on the relatively short conducting portion 175 of timing wheel 173 passes onto insulating portion 176 of this wheel, thereby breaking the circuit through field winding 194 and causing motor 96 and valve rod 95 to return to their neutral positions, thereby shutting off the supply of compressed air and gaseous fuel to combustion chamber 106. This point of cut off obviously may be varied as desired by varying the length of conducting portion 175. As the water level in expansion chamber 107 falls, that in chamber 104 rises and approaches the top of this chamber. Just before the water in chamber 104 reaches the top thereof, brush 178 bearing on timing wheel 171 rides off the conducting portion 175, thereby breaking the circuit extending through field winding 184, causing motor 126 and valve rod 125 to return to their neutral positions. In the event that brush 178 should still remain on the conducting portion of timing wheel 171 as the water level in chamber 104 reaches the top thereof, then the reactor 46 in the float controlled means of this chamber will operate to decrease the current flowing through the operating coil of limit switch 183 so as to cause this limit switch to open, thereby breaking the circuit for field winding 184. Simultaneously with the breaking of the circuit for field winding 184, timing wheel 172 completes a circuit for field winding 189 preparatory to the discharge of water from expansion chamber 104 through turbine 155 and into expansion chamber 107. At the same time that a circuit is established for field winding 189 a circuit is also established by timing wheel 174 for field winding 198, causing motor 96 to operate to move valve rod 95 to the right, as viewed in Fig. 1, thereby connecting combustion chamber 103 with the compressed air and gaseous fuel supply. Such compressed air and gaseous fuel upon burning in combustion chamber 103, expand tremendously, driving the water downwardly within expansion chamber 104 thereby repeating the cycle of operation.

It will be noted that every downward stroke of the expansion chambers is a power stroke, thereby providing high volumetric efficiency of the internal combustion apparatus of this invention. Also owing to the tremendous size of expansion chambers 104 and 107 and the enormous pressures obtaining within them, exceedingly high operating efficiencies are obtained which are not possible with any internal combustion engine as commonly constructed.

In operating the novel electric power generation plant of this invention, the speed of motor 7 is adjusted so as to cause compressor 11 to maintain the desired air pressure within storage tank 13. This pressure in any event must be sufficient to support a column of water equivalent to the height of pipe 31 or pipe 32. Compressed air supplied from storage tank 13 is compressed to a very high pressure in high pressure compressor chambers 23 and 24 and the highly compressed air is delivered from these chambers into the reservoir 89 to be supplied therefrom as in accordance with the requirements of combustion chambers 103 and 106. It is apparent that by varying the speed of motors 7 and 33, the pressure of the compressed air within the reservoir 89 may be varied at will. The master controller contained within the housing 98 determines the periods of the cycles of the expansion chambers 104 and 107 by regulating the flow of fuel and air into these chambers and the flow of water between them and through turbine 155.

The temperatures within combustion chambers 103 and 106 are very high not only owing to the enormous pressures and temperatures naturally obtaining within these chambers, but also because the compressed air supplied through pipes 93 and 101 is already highly heated as a result of compressing the same and is still further heated by the action of the preheaters 102 and 105.

Although two combustion chambers 103 and 106 together with two expansion chambers 104 and 107 are disclosed by way of example, it is to be understood that normally a multiplicity of such units would be employed, all of which units would be controlled by the master controller within housing 98. To carry out this control, it is merely necessary to increase the number of the timing wheels upon the shaft 169 together with their associated apparatus. The various expansion chambers would be timed so that they operate consecutively to produce a uniform power output.

Inasmuch as the novel generation system of the present invention is especially adapted for producing electric energy at a constant rate, in instances where the same is to be employed to carry a variable load cycle, use may be made of an auxiliary hydro-electric station installation such as that disclosed in my Patent #1,709,846.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In a power generating system, an internal combustion engine comprising a working cylinder located at great depth underground for developing power, a liquid driven turbine located upon the surface of the earth, liquid conveying conduit means connecting said turbine with said underground working cylinder, said working cylinder, said conduit means and said turbine containing a working liquid, said liquid serving to provide a piston for said working cylinder and also as an energy conveying means for conveying the power developed by said cylinder through said conduit means to said turbine, wherein the energy of said liquid is transformed to brake horse-power at the turbine shaft.

2. In a power generating system, an internal combustion engine comprising working cylinders located at a great depth underground, passages connecting said cylinders with the surface of the earth, hydraulic operable means located at the surface of the earth and communicating with said passages, said cylinders, said passages and said hydraulic operable means containing a working fluid, said fluid serving as pistons for said cylinders and acting to transmit power from said internal combustion engine cylinders to said hydraulic operable means, thereby causing the latter to deliver mechanical power, and valve mechanism located at the surface of the earth for controlling the movement of the working fluid.

3. In a power generating system, an internal combustion engine having cylinders consisting of huge caverns located at great depth underground, liquid turbines positioned at ground level above said caverns, passages connecting said caverns with said liquid turbines, said passages acting to convey working liquid from said caverns to said liquid turbines to operate the latter and then to convey said liquid back to said caverns, and gas turbines positioned at ground level and connected to receive the high pressure exhaust from said engine and operating to deliver power and to reduce the pressure of said exhaust to substantially atmospheric pressure.

4. In a power generating system, an internal combustion engine having cylinders consisting of huge caverns located at great depth underground, liquid turbines positioned at ground level above said caverns, passages connecting said caverns with said liquid turbines, said passages acting to convey working liquid from said caverns to said liquid turbines to operate the latter and then to convey said liquid back to said caverns, a high pressure exhaust gas reservoir positioned underground and connected to the exhaust outlets of said internal combustion engine, and gas turbines connected to said gas reservoir to receive high pressure exhaust gases therefrom and operating to deliver power and to reduce the pressure of said exhaust gases to substantially atmospheric pressure.

5. A power generating plant comprising, internal combustion means consisting of a combustion chamber and a communicating expansion chamber located at great depth underground, said expansion chamber having fluid therein, air compressor means positioned at great depth underground, fuel pump means, a turbine, piping interconnecting said combustion chamber with said air compressor and said fuel pump, and additional piping connecting said expansion chamber with said turbine, and valve means connected in said piping for regulating the flow of air and fuel to said combustion chamber and other valve means connected in additional piping for regulating the flow of fluid from said expansion chamber through said turbine.

6. In a power generating system, a high pressure internal combustion engine and compressor means for delivering high pressure gas to said engine, said compressor means comprising an auxiliary compressor located on the surface of the ground, high pressure compression cylinders located at great depth underground and connected to said auxiliary compressor to receive partly compressed gas therefrom, and pump means located on the surface of the ground and connected to said compression cylinders, said pump means serving to drive a working liquid into said compression cylinders to greatly compress the partly compressed air therewithin, said partly compressed air having a pressure sufficient to support a column of said working liquid equal to the depth of said cylinders below ground, whereby said pump means is constantly primed.

In testimony that I claim the invention set forth above I have hereunto set my hand this 24th day of January 1930.

FRAZER W. GAY.